REX L. SMITH
JOHN C. DALEY
INVENTORS

ATTORNEY

3,298,868
RESERVE ACTIVATED VOLTAIC BATTERY HAVING A GAS GENERATOR FOR SHOCK-FREE OPERATION
Rex L. Smith, Corona, and John C. Daley, La Sierra, Calif., assignors to the United States of America as represented by the Secretary of the Navy
Filed Apr. 29, 1964, Ser. No. 363,650
5 Claims. (Cl. 136—90)

The invention herein described may be manufactured and used by or for the Government of the United States of America for governmental purposes without the payment of any royalties thereon or therefor.

The present invention relates to means for activating reserve activated batteries and more particularly to a gas generator for producing high gas pressure in a smooth shock-free manner for a finite period of time.

This invention is also related to copending U.S. patent applications Serial No. 94,821 filed March 10, 1961, now abandoned, for Electric Current Producing Cell and Production of Current with Same, and Serial No. 281,964 fiiled May 21, 1963, now United States Patent Number 3,239,385, for Fluid Discharge Device.

There are many other devices in existence, such as primers, squibs, gas generators or blasting caps, that could perform part of the functions of the present device, but none have all the characteristics inherent in the present invention. Other devices do not deliver shock-free pressure, do not produce sufficient gas, and are too large or cumbersome. Prior devices tend to blow-up or damage the components of the reserve activated batteries in the process of activating them.

The instant device consists of a bridged plug assembly which has been beaded with a squib initiator mix, a booster charge and a main charge. This device is small and capable of applying pressure directly against an electrolyte chamber much like a hydraulic system, without any blow-up or damage to battery components to cause non-function thereof.

It is an object of the invention therefore to provide a novel gas generator for producing high gas pressure in a smooth shock-free manner for a finite period of time.

Another object of the invention is to provide a novel gas generator for applying pressure much like a hydraulic system directly against the electrolyte chamber of a reserve activated battery without blow-up or damage thereto.

A further object of the invention is to provide a novel small gas generator in combination with an electrolyte chamber for activation of reserve activated battery cells.

Other objects and many of the attendant advantages of this invention will become readily appreciated as the same becomes better understood by reference to the following detailed description when considered in connection with the accompanying drawings wherein.

Figure 1:
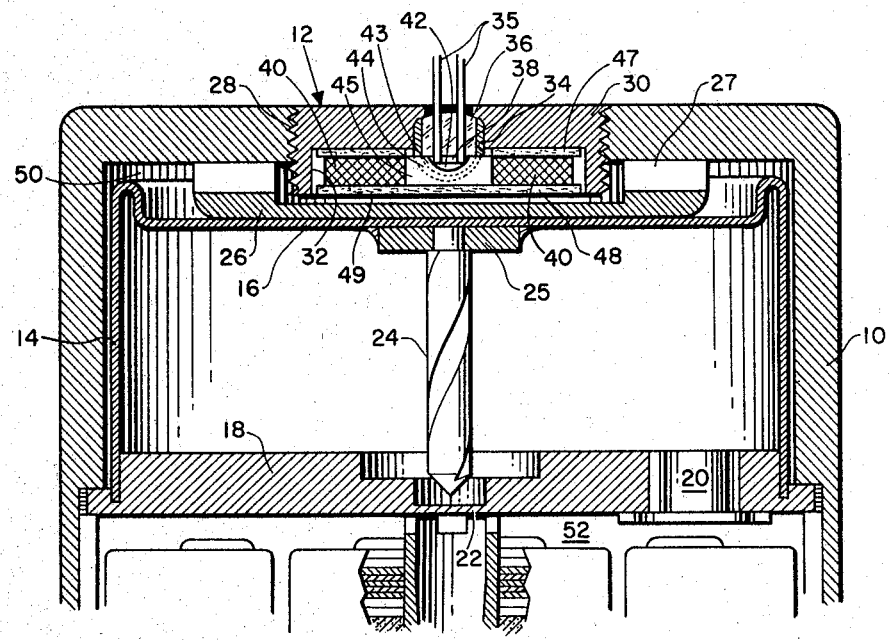
FIG. 1 is a detailed cross-sectional view of an embodiment of the invention showing the gas generator and electrolyte chamber for a reserve activated battery, prior to activation.

The figures of drawing show primarily the gas generator and reservoir portion of a reserve activated battery. An outer casing 10, designed to withstand very high internal pressures, houses the gas generator 12 and an electrolyte reservoir 14, as well as the battery cells which are only partly shown.

Reservoir 14 consists of a cup-shaped member formed of steel, for example, having the desired tensile strength and having a centrally formed inwardly deformed portion 16 at its end adjacent the gas generator 12. The open end of reservoir cup 14 is closed by a steel bulkhead 18 which is brazed to the cup to form a sealed container. A bore is provided through the bulkhead in which is inserted a boss 20 which is sealed in the bore and is used for the purpose of filling the reservoir with liquid ammonia or other electrolyte solution. The center of the bulkhead 18, in the interior of the reservoir, has a thinned area 22 which constitutes a rupturable membrane.

A drill lance 24 is connected to the inner surface of the center of the deformed portion 16 of the reservoir by means of a lance support disc 25. A drive disc 26 having a centrally depressed region is mounted centrally to the upper surface of the deformed portion 16. The upper surface of drive disc 26 is castellated to form upstanding lugs 27 to provide passageways therebetween and the inner surface of the end of casing 10.

Centrally of the end of casing 10 is a threaded bore 28, for example, in which an externally threaded gas generator cup 30 is inserted with a sealing material to provide a gas tight seal. A recess 32 is formed on the inner side of cup 30 and a flanged bore 34 extends therebetween and the outer surface of the cup. Lead wires 35 pass through a plug 36 of glass or the like in sealed relationship with bore 34 to the igniter-squib of the gas generator. The igniter-squib is unique in that it uses a system of charges which provide the characteristics needed by the gas generator material for ignition and stable burning. The igniter-squib utilizes these charges to convert the electrical energy, from a suitable source, applied across bridgewire 38 to a non-detonating rapid flame producing reaction which is capable of igniting the gas generating material 40. Gas generating material 40 consists of a disc of a mesa type double-base chemical propellant or other gas generator material, such as N–9, capable of generating a relatively cool gas in the pressure range of 600–1200 p.s.i. with a burning rate of .1 to .2 inch per second in this area at ambient temperature. Disc 40 is in contact with and surrounds the igniter-squib material hereinafter described.

The reaction triggered by heating bridgewire 38 initiates an initiator charge 42 (e.g. leads styphnate, lead dioxide, zirconium and binder) which produces a small "spit" of flame, with moderate amount of hot particles and moderate gas pressure. The flame from charge 42 is then augmented by a second charge 43, e.g. lead dioxide and zirconium, which provides a large amount of hot particles with very low gas production. This flame with its low gas production is further enhanced by a third and slowing burning mixture 44, consisting of boron and barium chromate and metal and halogenated hydrocarbon in a 50–50 mixture for example. Mixture 44 provides a flame with a longer duration, a large number of hot particles and a moderate amount of gas capable of igniting in minimum time a fourth charge 45 comprising a larger amount of metal and halogenated hydrocarbon for example. The entire sequence, thus taking place, provides the proper amounts of hot particles, hot gases and pressure to cause combustion of the gas generating material 40 without detonation. This sequence provides for ignition of the propellant in a radial and/or longitudinal direction depending on the configuration. The configuration illustrated in FIG. 1 causes the propellant to ignite on the inside diameter of the disc with the flame spreading to the flat surface of material 40. This ignition train can be varied to provide for hard to ignite propellants and to improve ignition of propellants at −65 and 165° F. since the novel combination of materials 42–45 do not emit large volumes of gas or produce severe shocks. The bridgewire (e.g. 1 ohm) in this device is mounted almost flush with the surface of glass plug 36 and does not generate a severe shock front reflected from the glass surface when the initiator charge 42 is fired. This gas generator is capable of operation in essentially zero free volume which when fired changes to approximately 1 cubic inch volume without a severe pressure drop that could cause the gas generating material 40 to be extinguished.

Initial burning of disc 40 takes place on its inside diameter with progressive burning taking place on this diameter and on one face of the disc. The control over these surfaces is achieved through design of grain 40 and through the use of discs 47 and 48, of fiberglass or the like. A cement, such as "Duco" cement may be used to fasten disc 47 in the recess 32 of generator cup 30, disc 40 to disc 47 and disc 48 to disc 40. A pressure sensitive cellophane tape layer 49, for instance, may be placed over the end of recess 32 in cup 30. Discs 47 and 48 and both the cement and tape layer 49 can act to inhibit burning of gas generating material 40 so that the chamber pressure is maintained at the desired level. Such retardation provides for smooth transfer from ignition to steady state burning in the increasing volume as the gas pressure causes reservoir to collapse to the state shown in FIG. 2.

Figure 2:
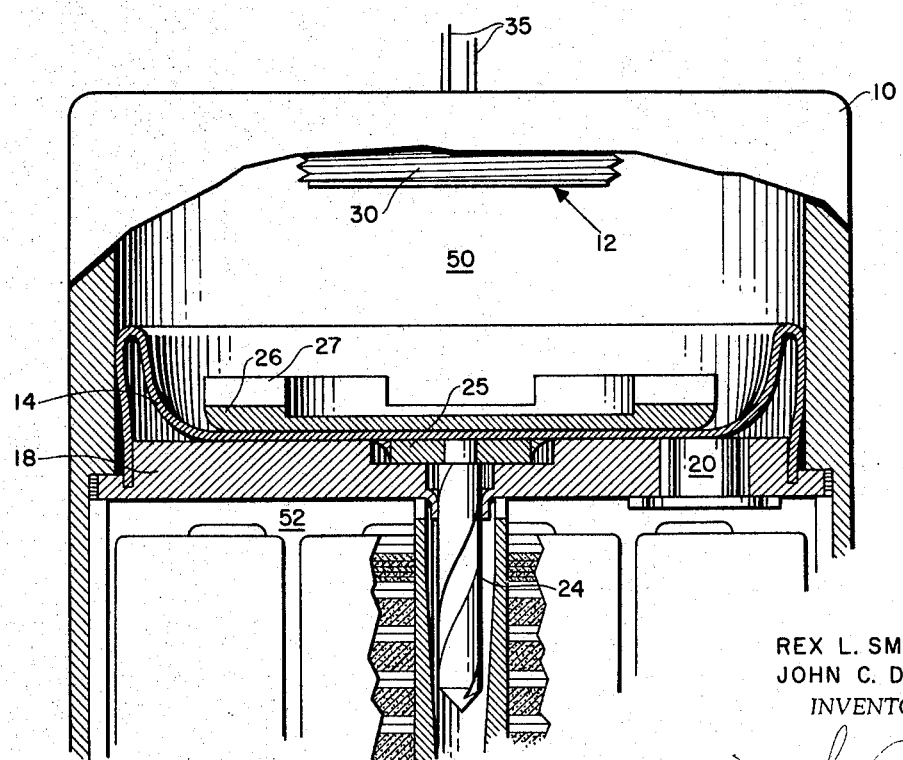
FIG. 2 shows the device of FIG. 1 after activation with the electrolyte reservoir collapsed.

When it is desired to activate the device, the bridgewire element 38 is activated causing combustion of charges 42, 43, 44 and 45 in sequence, which in turn ignite the disc of gas generator material 40. The gas generated at a predetermined rate from disc 40 will initially flow into the depressed region of drive disc 26, through the passageways formed by lugs 27 and fill the entire compartment 50 above the surface of reservoir cup 14. As gas continues to generate, and this occurs not instantaneously or explosively but at a moderate rate though accomplishing its purpose very rapidly, the force of the expanding gas will downwardly deform the end 16 of reservoir 14 and simultaneously drive lance 24 through the thin membrane area 22, piercing the same as shown in FIG. 2; and force electrolyte from reservoir 14 through the ruptured membrane into the battery compartment 52. The generated gas will continue to deform the reservoir and displace the electrolyte until such time as the pressure in the battery compartment equalizes the gas pressure above the reservoir cup. Additionally, due to the residual pressure of the gas there is no likelihood or possibility of the material of the reservoir being even partially returned to its initial position and this continued deformation prevents any of the liquid electrolyte from flowing out of the battery compartment and returning to the reservoir. This results in continued operation and efficiency of the battery regardless of the attitude of the battery or carrying vehicle.

The gas generator herein must provide sufficient energy to overcome the resistance of the metal parts, to exert a steady force as the reservoir collapses until the entire reservoir is emptied, and maintain the pressure so the electrolyte cannot return to the reservoir causing a drop in pressure within the battery area which could result in loss of electrical output. The gas generator exerts force only in the longitudinal direction since the sides of the reservoir are supported by the heavy casing 10 in such a manner that the gas from the generator cannot pressurize the sides.

The metal/halogenated hydrocarbon used in mixture 44 of the third charge, and in fourth charge 45 may be composed of a metal powder, such as magnesium, and a chlorinated or fluorinated material for providing an exothermic reaction.

Obviously many modifications and variations of the present invention are possible in the light of the above teachings. It is therefore to be understood that within the scope of the appended claims the invention may be practiced otherwise than as specifically described.

What is claimed is:

1. In a reserve activated voltaic battery a device for activating said battery consisting of the combination of an electrolyte reservoir having a rupturable membrane means and a gas generator for producing high gas pressure in a smooth shock-free manner for a finite period of time comprising:
    (a) a battery casing designed to withstand high internal pressures,
    (b) said gas generator and electrolyte reservoir housed within said battery casing such that gas produced by said gas generator will exert pressure on a surface of said reservoir to cause the rupture of the reservoir membrane, collapse of the reservoir and expulsion of electrolyte therefrom to activate said battery,
    (c) said gas generator including a gas generator cup containing a gas generator material capable of generating a relatively cool gas, a layer of material being provided on two surfaces of said gas generating material to inhibit the burning thereof for maintaining the desired level of pressure which the gas produced will exert against said reservoir surface,
    (d) an initiator charge, consisting essentially of a mixture of lead styphnate, lead dioxide, zirconium and binder, within said gas generator cup together with externally connected means for initiating said initiator charge to produce a small spit of flame with moderate amount of hot particles and gas pressure,
    (e) a second charge, consisting essentially of a mixture of lead dioxide and zirconium, which provides a large amount of hot particles with very low gas production surrounding said initiator charge and augmenting the flame from said initiator charge,
    (f) a third charge consisting essentially of a slow burning mixture of boron and barium chromate and metal and halogenated hydrocarbon for providing a flame with longer duration, a large number of hot particles and a moderate amount of gas surrounding said second charge and enhancing the flame from said second charge,
    (g) a fourth charge, consisting essentially of metal and halogenated hydrocarbon, surrounding said third charge and ignited by said third charge in a minimum time,
    (h) said gas generating material encircling and contacting said fourth charge; the ignition train formed by said four charges providing the proper amounts of hot particles, hot gases and pressure to cause combustion and progressive burning of said gas generating material without detonation.

2. A device as in claim 1 wherein said gas generating material is a mesa type double-base chemical propellant.

3. A device as in claim 1 wherein said fourth charge consists essentially of a metal powder and a chlorinated hydrocarbon for producing an exothermic reaction.

4. A device as in claim 1 wherein said fourth charge consists essentially of a metal powder and a fluorinated hydrocarbon for providing an exothermic reaction.

5. A device as in claim 1 wherein the gas generated will maintain said reservoir in its collapsed state and prevent electrolyte from returning to the reservoir.

No references cited.

WINSTON A. DOUGLAS, *Primary Examiner.*

B. OHLENDORF, *Assistant Examiner.*